March 31, 1970     E. L. WHISLER     3,503,429

TREE SHEAR

Filed June 28, 1968

*INVENTOR.*
EDWIN L. WHISLER

BY William A. Murray

ATTORNEY

United States Patent Office 3,503,429
Patented Mar. 31, 1970

3,503,429
TREE SHEAR
Edwin Lee Whisler, Moline, Ill., assignor to Deere & Company, Moline, Ill., a corporation of Delaware
Filed June 28, 1968, Ser. No. 740,921
Int. Cl. A01g 23/02
U.S. Cl. 144—34                                17 Claims

ABSTRACT OF THE DISCLOSURE

A tree shear composed of a U-shaped frame defining a throat for receiving a tree section and a pair of shearing blades on opposite sides of the throat with one being pivoted on the frame adjacent the open end of the frame and the other being pivotally mounted to the frame adjacent the closed end of the frame. A pair of cylinders mounted on the frame outward of the respective blades and adapted to shift the free ends of the blades into and out of the passage, whereby when shearing, one of the blades will move angularly about its pivot inwardly and toward the open end of the throat and the other blade will move angularly inwardly and toward the closed end of the throat.

BACKGROUND OF THE INVENTION

This invention relates to a tree shear and more particularly to a very simply constructed tree shear. Still more particularly the invention relates to a tree shear in which a pair of blades are positioned on opposite sides of a tree section and are pivotally carried on a supporting frame so that one blade will swing inwardly and forwardly and the other blade will swing inwardly and rearwardly when the tree section is being sheared.

There are conventionally two types of tree shears. The first is composed of a rigid frame having an open throat. A tree section is permitted entry into the throat and a single blade is forced across the throat to thereby sever the tree section. The problem that exists with such a shear is that the blade will tend to tilt the tree as it is forced through the tree and in many cases it causes the tree to crack or splinter before the blade is completely through it. A second type of tree shear is one in which two blades are supported on a frame and on opposite sides of a throat. The blades are then forced into the throat simultaneously so as to shear the tree from opposite sides. Normally the blades are mounted on either a single pivot or two pivots that are spaced relatively closely together. Thus, the two blades will normally operate in a scissoring effect to shear through the tree as they come together. This also creates a tilting effect against the tree and often in this type of shearing arrangement the tree will splinter. To overcome this, many tree-harvesting devices have provided tree-gripping structure which will hold the tree against tilting as it is being sheared. This has not proven to be completely successful in regard to preventing the splintering of the tree. Also, some shearing devices have been designed to provide linkages that support the respective blades on the frame and which operate to move the blades inwardly while retaining them close to being parallel with one another. The problem that exists in this latter type of shearing device is that the linkages must be somewhat complicated and must utilize several pivot pins and guides for their respective blades. The tree shear must be relatively small and consequently the pins and linkages must also be relatively small. The shears must also be adapted to withstand extremely large loads when they are shearing a tree. Consequently often times the linkages and pins have proven to be unsatisfactory in this latter type of blade support.

SUMMARY OF THE INVENTION

With the above in mind it is the primary object of the invention to provide a two-bladed tree-shearing device in which each blade is carried on the supporting frame by a single pin. A single hydraulic cylinder is provided for each blade and is connected to the respective blade by a simple clevis connection and to the respective framework by a second pivot pin. More specifically it is the object of the present invention to support the blades so that one of the blades extends in one direction from its pivotal connection and the other blade extends in the opposite direction from its pivotal connection. The two blades, when spaced apart, define a tree-entry area with the cutting edges of the blades defining the edges of the area. Thus, as the blades move inwardly into the area for purposes of shearing the tree, one blade will move inwardly toward the closed end of the access area and the other blade will move inwardly toward the open end of the tree-access area. Consequently the tree section will be severed on opposite sides by the respective blades that are diametrically opposite to one another. This will prevent tilting of the tree as the shear blades are entered into the tree.

It is a further object of the present invention to provide the frame in the above-described structure to be composed of upper and lower U-shaped plates that fit above and below or on opposite sides of the cylinders and blades in order to protect them from damage. The plates are parallel and are of U-shaped construction with the throat of the U being the area in which the tree is severed. When the blades are retracted into the frame, the cutting edges lie alongside the edges of the throat and are ready for insertion across the throat upon the tree section being inserted.

DESCRIPTION OF THE PREFERRED EMBODIMENT

Figure 1:
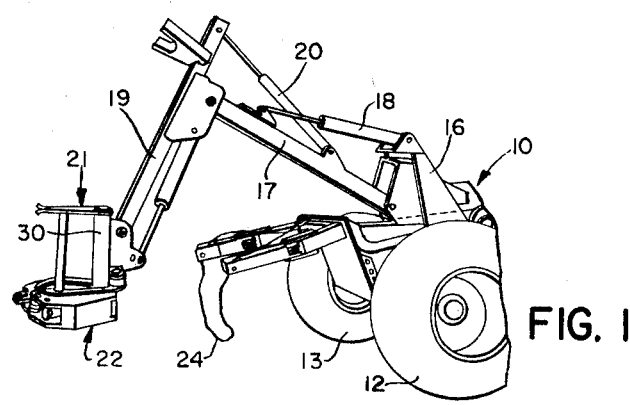
FIG. 1 is a rear and side perspective view of a part of a tree harvester.

The harvesting structure is supported on an end portion 10 of a tractor that is carried on traction wheels 12, 13. A boom 17 is carried on a base support 16 mounted on the tractor portion 10. The boom 17 is controlled by a hydraulic cylinder 18 and carries at its outer end a second boom 19 controlled by a hydraulic cylinder 20. On the free end of the boom 19 is a log-gripping device 21 and directly beneath the gripping device 21 is the log-shearing device 22 of the present invention. The devices 21, 22 may be controlled angularly about the end of the boom by a hydraulic cylinder 23. The gripping device 21 may be of any of many types commercially available, the details of which serve no part of the present invention. Generally the gripping device 21 holds a tree while the shearing device 22 operates to shear it. Also, the gripping device 21 is used to transport the tree once it is sheared. An accumulator structure, indicated in its entirety by the reference numeral 25 is provided on the end portion 10 of the tractor and is of the type that has a cable 24 that receives and bunches trees for dragging them through a forest.

The harvesting structure 22 is composed of a basic U-shaped frame that has upper and lower or spaced apart U-shaped plates 27, 28 respectively. The U-shaped plates 27, 28 provide for an inner tree-receiving throat with an entry area adjacent the rear or open side of the U-shaped frame. The plates 27, 28 carry an upright post 30 on which is partially carried the gripping device 21. The gripping device, of course, need be no part of the shearing device. The inner edges 31, 32 of the upper and lower plates 27, 28 define the sides of the throat.

Figure 2:
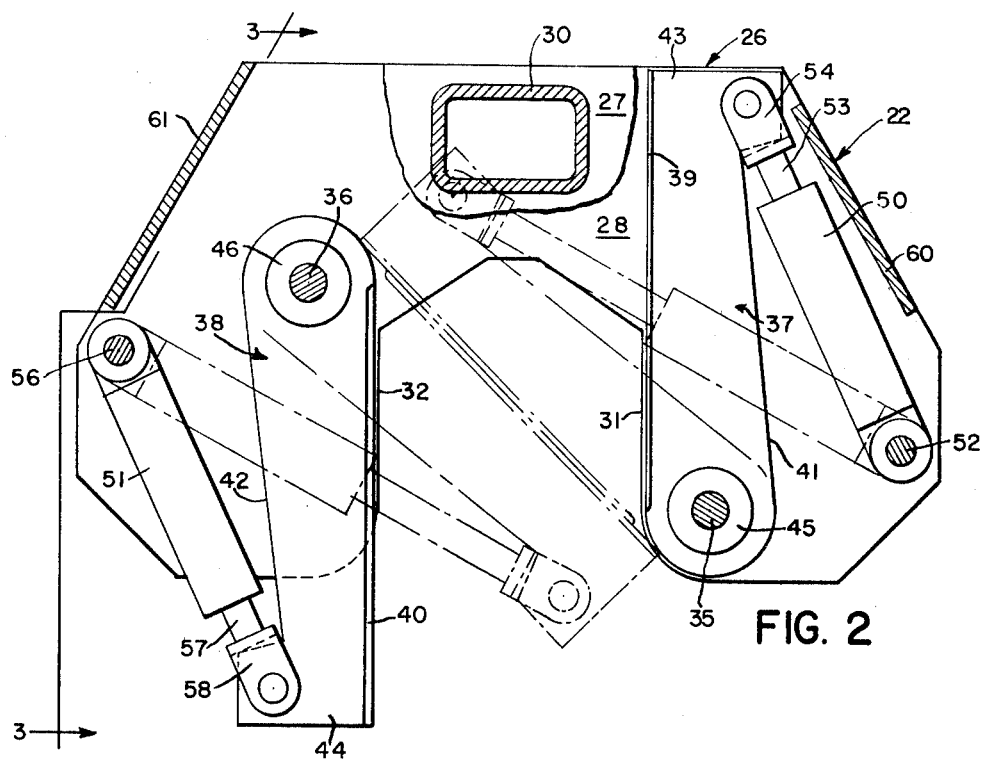
FIG. 2 is a sectional view taken substantially along the line 2—2 of FIG. 1.

Referring now to FIG. 2, a pivot pin 35 is provided at the entry end of the throat and adjacent the left-hand edge 31. The pin 35 extends through the upper and lower plates 27, 28 and is fixed thereto. A second pin 36 is provided on the opposite side of the throat and adjacent the closed end of the throat. The pin 36 is also supported by the upper and lower plates 27, 28. Supported on the first pin 35 is a first or rearwardly projecting blade 37 and supported on the pin 36 is a second or forwardly projecting blade 38. The blades 37, 38 have inner cutting edges 39, 40 and outer edges 41, 42. Also, as may be seen from viewing FIG. 2, the blades extend in opposite directions from their respective pivots 35, 36 to free ends 43, 44. The edges 39, 40 face one another across the throat of the frame 26 and when the blades 37, 38 are substantially parallel to one another, they are recessed inwardly of the sides 31, 32 of the frame 26 and are also spaced apart to define a tree-access area having an entry at the open end of the throat. The blades 37, 38 have relatively large and thick hub portions 45, 46 that extend the expanse between the frame plates 27, 28.

Positioned outwardly of the respective blades 37, 38 are power means in the form of hydraulic cylinders 50, 51. The cylinder 50 is supported on the plates 27, 28 by a pivot pin 52 that is also positioned outwardly of the pin 35. The ram 53 of the cylinder 50 is connected by a clevis 54 to the free end 43 of the blade 37.

The cylinder 51 is supported on the plates 27, 28 by a pin 56 and extends from the pin to the free end 44 where its ram 57 is connected thereto and adjacent the trailing edge 42 by a clevis connection 58. Thus, the cylinders 50, 51 are positioned outwardly of the respective blades 37, 38 and are connected to the blades at their free ends 43, 44 and adjacent outer edges 41, 42.

Figure 3:
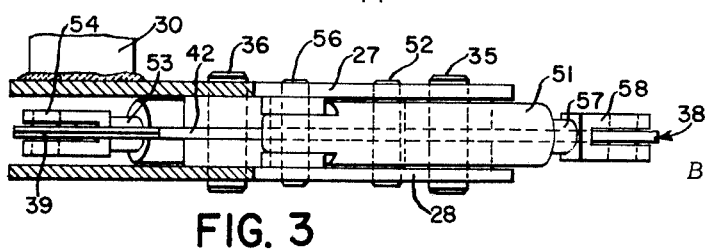
FIG. 3 is a side view of the shearing device shown in FIG. 2 as taken along the line 3—3 of FIG. 2.

Reviewing FIGS. 2 and 3, it will be noted that when the blades 37, 38 are spaced apart to permit entry of a tree section, substantially all of the movable parts are positioned between the plates 27, 28. Thus, the frame structure 26 serves as a housing to generally prevent damage from occurring to the hydraulic cylinders 50, 51 and the blades 37, 38. The plates 27, 28 may be joined by vertical flanges 60, 61 along their outer edges to provide a box-like structure for the moving parts.

In operation the hydraulic cylinders 50, 51 shift the blades 37, 38 out of the tree-receiving area of the throat so that a tree section may be inserted therein. When so positioned, the hydraulic cylinders 50, 51 may be extended to shift the blades 37, 38 into and across the passage. The cylinder 50 will shift the blade 37 so that it advances angularly about the pin 35 toward the open end of the throat. The cylinder 51 may extend to force the blade 38 angularly on the pivot pin 36 and toward the closed end of the throat. The blades 37, 38 are coplanar and the cutting edges 39, 40 will advance toward one another to close the gap between them until they abut one another, such being shown in dotted representation in FIG. 2. At this time a tree section within the throat will be completely severed. It should also be noted that the rams and cylinders are so positioned that the shearing action occurs in both instances on the power stroke of the respective cylinders. It should also be noted that as the blades 37, 38 penetrate through the tree section that the cutting edges 39, 40 will always engage the section at substantially diametrical opposite portions thereof. The units also provide substantially equal penetration from opposite sides and at the same time and consequently there will be little tendency for the tree to tilt due to the shearing action.

Thus, there has been provided a shearing device that is composed of a pair of shearing blades supported on pivots that are offset to one another so that the blades extend in opposite directions from their respective pivots and define a tree-cutting area therebetween. It has been further provided for the blades and their control cylinders to be supported and interconnected by very simple pivotal connections without use of any intermediate linkages. The blades, when shearing, will move their respective cutting edges into and from diagonally extending abutting positions.

What is claimed:

1. A tree-shearing device comprising a main frame; first and second substantially parallel pivots on the frame; first and second elongated blades supported on the respective first and second pivots and extending in opposite directions in respect to one another from their respective pivots with their cutting edges adapted to advance toward one another as the blades swing angularly in the same direction about their respective pivots; and power means between the blades and frame adapted to shift the blades to open a gap between the cutting edges, to admit a tree section and to close the gap between the cutting edges to shear the tree section.

2. The structure as set forth in claim 1 in which the frame has spaced apart sides defining a throat for entry of a tree section, the first and second pivots are supported on the respective sides in offset relation in respect to one another along the throat; and the free end of each blade is opposite the pivoted end of the other and approaches the respective pivoted end as the gap closes between the blades.

3. The structure as set forth in claim 2 in which the blades are adapted to recess into the respective sides of the frame as the power means retracts the blades to open the gap between the cutting edges.

4. The structure as set forth in claim 2 in which the power means is a pair of extensible and retractable hydraulic motors with each extending between one of the blades and the framework and lying in substantially the planes of the respective blades, with each of the cylinders being on the opposite side of the respective blade than its cutting edge.

5. The structure as set forth in claim 4 in which the frame structure includes a pair of spaced plates on opposite sides of and for shielding the blades and cylinders with the plates having opposed inner edges defining the sides of the throat.

6. The structure as set forth in claim 1 in which the frame is U-shaped and has opposite sides and a closed end defining a throat opening from an entry end, the first pivot is on the frame on one side of the throat adjacent the entry end, the second pivot is on the frame on the opposite side of and at the closed end of the throat, and the first blade extends from the first pivot toward the closed end, and the second blade extends from the second pivot toward the entry end.

7. The structure as set forth in claim 6 in which upon the blades being shifted to open the aforesaid gap they will lie alongside the sides of the throat to thereby permit entry of a tree section into the throat and between the cutting edges.

8. The structure as set forth in claim 6 in which upon the blades being shifted to close the gap the cutting edges will extend diagonally across the throat.

9. The structure as set forth in claim 6 in which the respective blades are coplanar with one another and when the gap is closed the blade edges substantially abut and cross the throat.

10. The structure as set forth in claim 6 in which the power means are a pair of extensible and retractable hydraulic cylinders supported at one of their respective ends on pivots supported on the frame substantially parallel to and outwardly of respectively the first and second pivots, with means at their opposite ends for connection to the respective first and second blades.

11. The structure as set forth in claim 10 in which the frame is composed of flat parallel structures on opposite sides of the blades and cylinders, and the blades when alongside the sides of the throat are retracted between the structures.

12. A shearing device for shearing tree sections composed of a frame structure having a pair of opposite spaced apart side portions extending from respective free ends to an interconnecting end portion, the side and end portions defining a tree-receiving opening with an entry area between the free ends; a first shearing blade pivotally supported at one end on the frame structure adjacent the free end of a side portion and extending toward the end portion whereby the blade may advance in the opening toward its opposite side portion and the entry area; a second shearing blade pivotally supported at one end on the frame structure on the opposite side of the opening and extending toward the free end of the aforesaid opposite side portion whereby the second blade may advance in the opening toward the end portion and its opposite side portion; and power means for advancing and retracting the first and second blades.

13. A tree-shearing device composed of a frame, a pair of blades supported on a pair of spaced pivots on the frame with one blade extending from its pivot in one direction to its free end and the other blade extending from its pivot in the opposite direction to its free end, with said pivots being offset from one another so that said blades may be spaced apart to define a tree-access area having an open end and bordered at its sides by cutting edges of the respective blades; and power means on the frame for shifting one of the blades angularly into the area and toward the open end and the other of the blades angularly into the area and away from the open end.

14. The structure as set forth in claim 13 in which the blades are coplanar and the cutting edges may abut one another along a diagonal in the area.

15. The structure as set forth in claim 13 in which the power means are hydraulic cylinders anchored to the frame and positioned outwardly from the blades in respect to the tree-access area and connected to the respective blades whereby the blades are shifted into the area upon the power strokes of the cylinders and withdrawn from the area upon the return stroke of the cylinders.

16. The structure as set forth in claim 13 in which the power means are a pair of extensible and retractable cylinders pivotally supported on the frame at their respective ends outwardly of the respective pivots for the blades and having their opposite ends connected to the outer edges of the respective blades.

17. The structure as set forth in claim 13 in which the power means are a pair of extensible and retractable hydraulic cylinders connected to the respective outer edges of the blades adjacent their free ends and diverging therefrom to the opposite ends of the respective cylinders, the latter ends being offset outwardly in respect to said area from the pivots supporting the blades; and pivots supporting said opposite ends on the frame.

References Cited

UNITED STATES PATENTS 3,122,184  2/1964  Larson _____ 144—34

GERALD A. DOST, Primary Examiner

U.S. Cl. X.R.

144—3